United States Patent [19]

Mizumoto

[11] 4,283,665
[45] Aug. 11, 1981

[54] METHOD AND APPARATUS FOR ELIMINATING RIPPLE COMPONENT FROM MOTOR CONTROL LOOP

[75] Inventor: Katsuzi Mizumoto, Tokorozawa, Japan

[73] Assignee: Pioneer Electronic Corporation, Tokyo, Japan

[21] Appl. No.: 718,256

[22] Filed: Aug. 27, 1976

[30] Foreign Application Priority Data

Aug. 28, 1975 [JP] Japan .................. 50/117591[U]

[51] Int. Cl.³ .................. G05B 5/00; H02P 5/00; H02P 7/00
[52] U.S. Cl. .................. 318/317; 318/331; 318/621; 318/622
[58] Field of Search .......... 318/331, 459, 621, 622, 318/317; 321/10; 333/79; 330/69; 363/45, 46, 47, 48

[56] References Cited

U.S. PATENT DOCUMENTS

| 2,751,548 | 6/1956 | Gunderson | 333/79 |
|---|---|---|---|
| 2,892,164 | 6/1959 | Woll | 333/79 |
| 3,474,346 | 10/1969 | Schaefer | 321/10 |
| 3,518,519 | 6/1970 | Callan | 318/332 |
| 3,551,780 | 12/1970 | Gautherin | 333/79 |
| 3,600,663 | 8/1971 | Wagner | 333/79 |
| 3,761,741 | 9/1973 | Hoeft | 330/69 |

FOREIGN PATENT DOCUMENTS 2064401  7/1972  Fed. Rep. of Germany .......... 318/331

Primary Examiner—S. J. Witkowski
Assistant Examiner—Eugene S. Indyk
Attorney, Agent, or Firm—Sughrue, Rothwell, Mion, Zinn and Macpeak

[57] ABSTRACT

In a motor control circuit, a rotational speed detection signal containing a ripple component superimposed on a d.c. component is applied to both a low pass filter/phase lagging circuit and to a phase leading circuit, the output signals of which have a phase difference of approximately 180 degrees, to effectively cancel the ripple component and thereby extract only the d.c. component. The latter is balanced against an r.p.m. reference voltage in a comparison circuit whose output is fed back to a drive winding control circuit of the motor.

4 Claims, 3 Drawing Figures

METHOD AND APPARATUS FOR ELIMINATING RIPPLE COMPONENT FROM MOTOR CONTROL LOOP

BACKGROUND OF THE INVENTION

This invention relates to a method and apparatus for improved motor speed control, particularly but not exclusively useful in connection with record player turntable drives.

In conventional motor control circuits, especially those employing a voltage control system as generally shown in the block diagram of FIG. 1, the rotational speed of a motor driven by a drive winding control circuit 1 is sensed by counter electromotive forces induced in the motor drive coils L1, L2 and L3, shown here as included in a detection circuit 2. The induced sensing signals are rectified by diodes D1, D2 and D3 and combined to provide a signal proportional to the rotational speed of the motor. This speed detection signal is filtered by a low pass filter 3 and is compared with a reference voltage corresponding to a predetermined rotational speed of the motor in a comparison circuit 4, to thereby achieve the speed control of the motor.

In this rotational speed control system of the prior art, the frequency of the fundamental component of the alternating ripple signal induced in the motor drive coils is extremely low, as a result of which the S/N ratio and the wow and flutter characteristics tend to degrade. In order to overcome this difficulty, the low pass filter 3 is employed to smooth and thereby reduce the adverse effects of the ripple signal. This causes the phase lag of the loop to increase as the ripple signal decreases, however, and if the loop gain is increased to compensate for such phase lag the transient characteristics of the system become worse. See, for example, U.S. Pat. No. 3,651,368 issued on Mar. 21, 1972 and assigned to the assignee of the present invention.

In order to at least partially overcome these difficulties the inertia of the flywheel or turntable can be increased, but this adversely affects the start characteristics of the system.

SUMMARY OF THE INVENTION

The object of the present invention is therefore to provide a motor speed control circuit including circuitry for cancelling an unwanted ripple component, whereby the adverse effects of the ripple signal are advantageously reduced without increasing the phase lag, and wherein the wow and flutter characteristics and the S/N ratio can be substantially improved without affecting the transient characteristics, the loop gain or the start characteristics of the system.

The foregoing and other objects of the invention are achieved by the provision of a motor speed control circuit in which a rotational speed detection signal containing a ripple component superimposed on a direct current component is applied to both a low pass filter/phase lagging circuit and to a phase leading circuit, the output signals of which have a phase difference of approximately 180 degrees to thereby cancel the ripple component and leave only the desired direct current component, the latter then being compared with a selected d.c. reference voltage to derive a final speed control signal which is fed back in servo loop fashion to a drive winding control circuit.

DETAILED DESCRIPTION OF THE PREFERRED EMBODIMENTS

Figure 1:
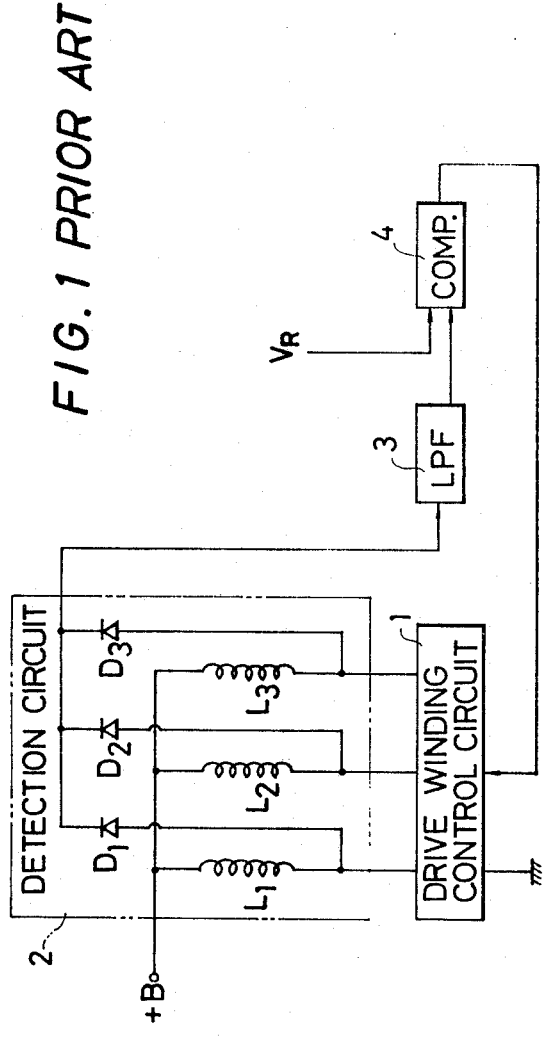
FIG. 1 is a circuit diagram, partly in block form, illustrating a conventional motor speed control circuit.

A first embodiment of a motor speed control circuit according to this invention will be described with reference to FIG. 2. The circuit generally comprises a drive winding control circuit 1 and a detection circuit 2 which are identical to those shown in FIG. 1, a low pass filter/phase lagging circuit 3 of the active type employing an emitter-follower transistor Tr1, and an RC phase leading or advancing circuit 5.

The values of the resistor $R_5$ and the capacitor $C_3$ in the phase leading circuit 5 are so selected that the sum of the absolute value of the phase lag produced by the low pass filter 3 and the absolute value of the phase advance produced by the phase leading circuit 5 is 180 degrees.

Figure 2:
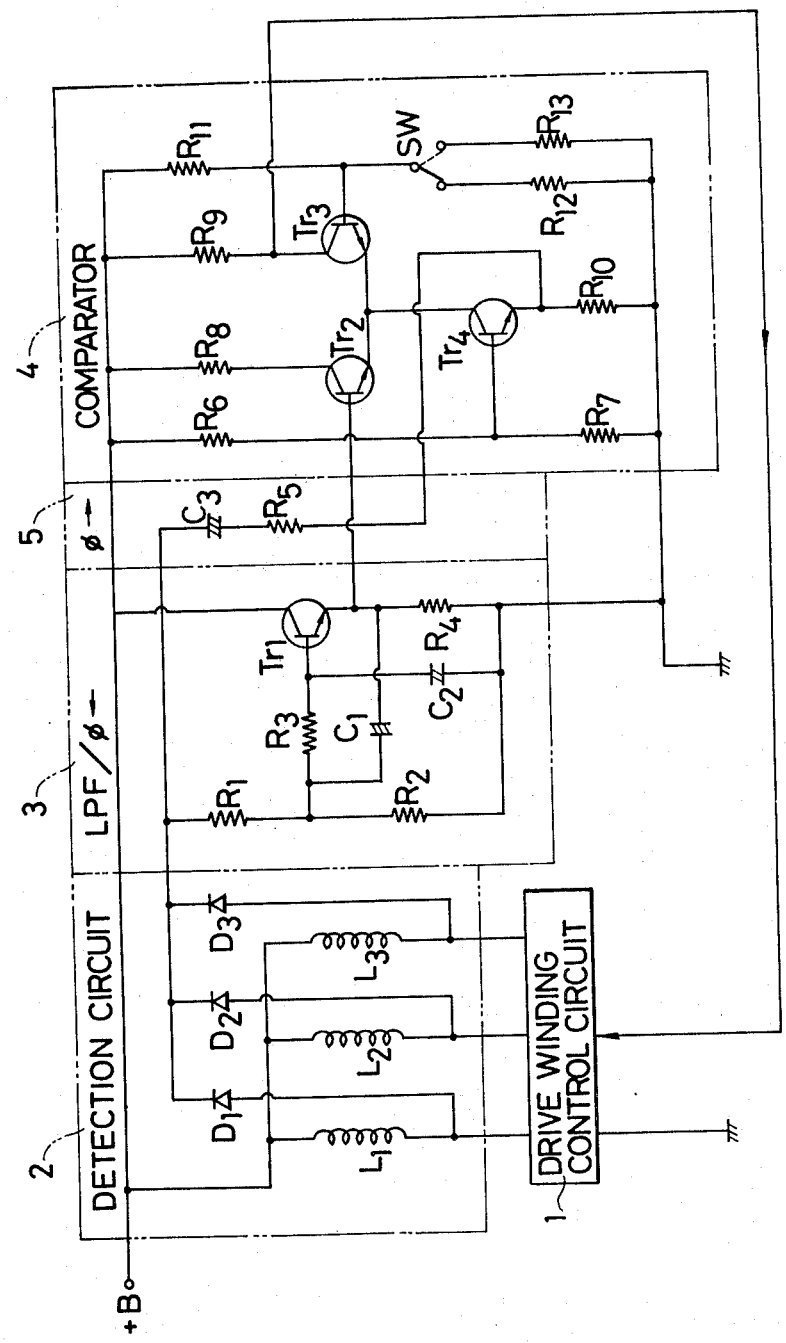
FIG. 2 is a schematic circuit diagram illustrating a first embodiment of a motor speed control circuit according to this invention.

The circuit shown in FIG. 2 further comprises a comparison circuit 4 having transistors Tr2 and Tr3 which form a differential amplifier circuit, and a transistor Tr4 connected to the emitters of Tr2 and Tr3. The output signal from the low pass filter is applied to the base of Tr2, while a selected reference voltage is applied to the base of Tr3. The application of the reference voltage is controlled by the operation of a switch SW in a voltage divider including resistors $R_{11}$, $R_{12}$ and $R_{13}$. More specifically, the armature of the switch SW occupies the position indicated by the solid line for 33 rpm operation, and occupies the position indicated by the dotted line for 45 rpm operation.

Transistor Tr4, to the emitter of which the output signal from the phase leading circuit 5 is applied, operates as a grounded-base amplifier with respect to the phase leading signal, and as a constant current source for the differential amplifier formed by Tr2 and Tr3 with respect to the phase lagging signal from the low pass filter 3.

When switch SW is set to the position shown by the solid line in FIG. 2 so as to apply a drive voltage to the winding control circuit 1, the motor rotates at 33 rpm, as determined by the values of resistors $R_{11}$ and $R_{12}$. If at this speed the fundamental frequency component of the ripple signal superimposed on the d.c. component of the velocity detection signal is 6.6 Hz, the phase lag produced by the low pass filter 3 is 160 degrees, and a signal containing this ripple component is applied to Tr2. On the other hand, the phase shift advance produced by the phase leading circuit 5 is 20 degrees, and the output therefrom, also containing the ripple component, is applied to the emitter of Tr4. Thus, there is a combined phase difference of 180 degrees between the output signal of the low pass filter 3 and that of the phase leading circuit 5.

Initially, during start up, while the base voltage of Tr2 is increasing, the emitter voltage of Tr4 is decreasing. During this period of time a heavy bias is applied to Tr4, and the collector voltage thereof is accordingly decreased. As a result, the biases applied to Tr2 and Tr3 are increased, and the collector voltages thereof are decreased. At the same time, the collector voltage of Tr2 is further decreased because the signal from the low pass filter 3 is applied to the base of Tr2, and therefore, owing to the differential arrangement, the collector voltage of Tr3 is increased by the same amount that the collector voltage of Tr2 is decreased. In consequence, the ripple signal component in the phase lagging signal produced by the low pass filter 3 and the ripple signal component in the phase leading signal produced by the phase leading circuit 5 are cancelled by Tr3, and only the desired d.c. component of the speed sensing signal remains at the collector of Tr3.

As the base voltage of Tr2 continues to decrease, the emitter voltage of Tr4 continues to increase, and therefore the collector voltage of Tr3, which serves as an error signal with respect to the selected operating speed, is gradually diminished.

Thus, the ripple signal component from the detection circuit 2 is cancelled and only the d.c. component is obtained at the collector of Tr3 and is applied as a control voltage to the drive circuit 1. More specifically, the d.c. component of the detection circuit signal is delivered through the low pass filter 3 to the base of Tr2 in the differential amplifier circuit 4 and is there compared with the base voltage (reference d.c. voltage) of Tr3. The level of the difference as a result of the comparison is amplified and fed back in servo loop fashion as the control signal for the motor winding drive circuit 1.

If switch SW is set to the position indicated by the dotted line FIG. 2, the circuit will operate as described above, but the constant rotational speed of the motor will be 45 rpm.

Figure 3:
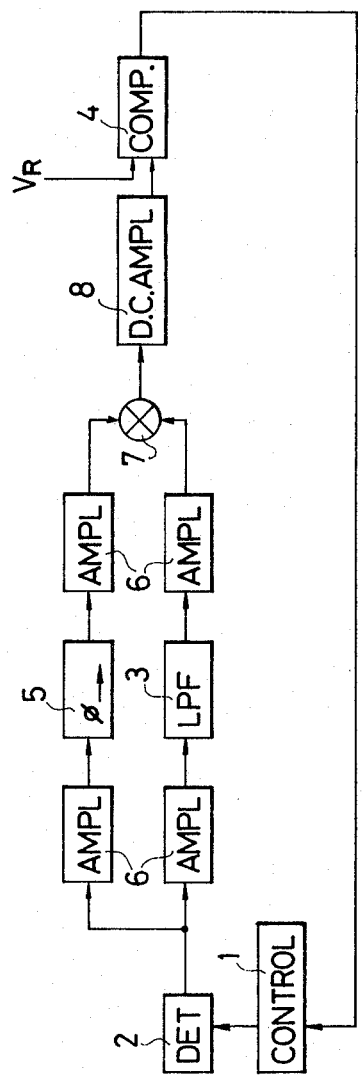
FIG. 3 is a block diagram showing a second embodiment of the motor speed control circuit of the invention.

In the FIG. 2 embodiment, the signals from the low pass filter 3 and the phase leading circuit 5 are separately applied to Tr2 and Tr4 in the comparison circuit 4, and therefore these signals never interfere with each other to adversely affect the operation of the circuit. However, if these signals are merely added to cancel the ripple component, such interference is liable to take place. Therefore, in this case, it is necessary to provide buffer amplifiers 6 at the input and output sides of both the phase leading circuit 5 and the low pass filter 3, as shown in FIG. 3, in which reference numerals 7 and 8 designate an adder and a d.c. amplifier, respectively. In the circuit of FIG. 3, the comparison circuit 4 implements only the comparison of the d.c. components.

It is difficult to design the low pass filter 3 and the phase leading circuit 5 so that they will provide an absolute phase difference of exactly 180 degrees for all of the involved frequency bands. However, it is possible to design these circuits to provide an absolute phase difference of approximately 180 degrees with respect to only the fundamental or first harmonic component of the ripple signal. In this manner, the higherorder harmonic components can be removed by a simple filter having a small time constant. Further, it is not always necessary to limit the absolute phase difference to exactly 180 degrees since even if this phase difference shifts or varies slightly, the error signal caused thereby is of a relatively high frequency and can easily be eliminated by the use of the simple filter described above.

The circuit shown in FIG. 2 has been actually constructed, and found to perform satisfactorily in the manner disclosed above, using the following component values:

| | | | |
|---|---|---|---|
| Tr1,4 | 2 SC 945 | $R_{7,8,9}$ | 820Ω |
| Tr2,3 | 2 SC 1344 | $R_{10}$ | 560Ω |
| $R_{1,4,6}$ | 6.8 KΩ | $R_{11}$ | 8.2 KΩ |
| $R_{2,12}$ | 20 KΩ | $R_{13}$ | 30 KΩ |
| $R_3$ | 10 KΩ | $C_1$ | 33 μf |
| $R_5$ | 330Ω | $C_2$ | 3.3 μf |
| | | $C_3$ | 100 μf |

The present invention has been described with reference to an E-servo in which the rotational speed detection signal is sensed as a voltage variation. As will be readily apparent to anyone skilled in the art, however, the concept of the invention is equally applicable to a so-called f-servo, in which the rotational speed is detected by frequency variations, and to a phase-servo.

What is claimed is:

1. A motor speed control circuit of the servo loop type, comprising:
    (a) a motor drive winding control circuit,
    (b) a detection circuit for developing a speed signal proportional to the motor speed, said speed signal comprising a ripple component superimposed on a d.c. component,
    (c) a low-pass filter for smoothing the speed signal and simultaneously producing a phase lag therein,
    (d) a source of reference voltage proportional to a desired motor speed,
    (e) a comparator for producing an output proportional to the difference between the reference voltage and the filtered speed signal,
    (f) means for feeding back the comparator output as a control signal to the drive winding control circuit,
    (g) a phase leading circuit for advancing the phase of the speed signal by an amount equal to approximately 180 degrees minus the phase lag produced by the low-pass filter,
    (h) means coupling the speed signal to the phase leading circuit,
    (i) means coupling the output of the phase leading circuit to the comparator, and
    (j) means in the comparator for acting on the low-pass filter output and the phase leading circuit output to cancel the ripple component, whereby substantially only the d.c. component of the speed signal is fed back to the drive winding control circuit.

2. A motor speed control circuit as defined in claim 1 wherein the comparator comprises a differential amplifier including first and second transistors having coupled emitters, and a third transistor whose collector is connected to said coupled emitters, the output from the low pass filter being coupled to the base of the first transistor, the output from the phase leading circuit being coupled to the emitter of the third transistor, and the reference voltage being coupled to the base of the second transistor.

3. A motor speed control circuit as defined in claim 2 wherein the reference voltage is derived from a switchable voltage divider whereby a given reference voltage may be selected according to a desired motor speed.

4. A method of motor speed control comprising the steps of:
    (a) deriving a speed signal proportional to the motor speed, said speed signal comprising a ripple component superimposed on a d.c. component,
    (b) filtering said speed signal and simultaneously retarding the phase thereof by X degrees, (c) advancing the phase of said speed signal by approximately 180-X degrees, (d) comparing the phase advanced speed signal with the phase retarded speed signal to cancel the ripple component and retain substantially only the d.c. component, (e) comparing said d.c. component with a reference voltage to derive an error signal, and (f) feeding said error signal back in servo loop fashion to motor drive winding control means.

* * * * *